United States Patent [19]
Reilly et al.

[11] 3,928,289

[45] Dec. 23, 1975

[54] HYDANTOIN PRODUCED POLYURETHANE

[75] Inventors: Charles B. Reilly, Uniontown; Robert K. Rossi, Akron, both of Ohio

[73] Assignee: The Goodyear Tire & Rubber Company, Akron, Ohio

[22] Filed: Dec. 26, 1973

[21] Appl. No.: 428,594

[52] U.S. Cl. .................... 260/75 NQ; 260/77.5 AQ
[51] Int. Cl.² .......................................... C08G 18/38
[58] Field of Search .. 260/77.5 AQ, 2.5 AQ, 75 NQ

[56] References Cited
UNITED STATES PATENTS

| | | | |
|---|---|---|---|
| 2,850,474 | 9/1958 | Maxey | 260/75 NQ |
| 2,995,530 | 8/1961 | Frisch et al. | 260/77.5 AQ |
| 3,365,426 | 1/1968 | Walles | 260/77.5 AQ |
| 3,635,845 | 1/1972 | Porret et al. | 260/2 N |
| 3,681,282 | 8/1972 | Preston | 260/46.5 E |

*Primary Examiner*—M. J. Welsh
*Attorney, Agent, or Firm*—F. W. Brunner; J. D. Wolfe

[57] ABSTRACT

A polyurethane prepared by reacting a mol of a reactive hydrogen material of 700 and higher molecular weight with 1.2 to 3.5 mols of organic polyisocyanate and 0.2 to 2 mols of dihydroxyalkyl dialkyl hydantoin where the alkyl radical contains from 1 to 10 carbon atoms.

3 Claims, No Drawings

HYDANTOIN PRODUCED POLYURETHANE

This invention relates to a method of making improved polyurethanes and to said polyurethanes. More particularly, this invention relates to thermoplastic polyurethanes which may be solvent soluble.

The polyurethanes of this invention can be made by using the one-shot, prepolymer or quasi prepolymer methods to react a reactive hydrogen material with an organic polyisocyanate and a curative of di-hydroxyalkyl alkyl hydantoin to give a cured polyurethane. Use of the dihydroxyalkyl alkyl hydantoins where the alkyl group has from 1 to 10 and preferably 1 to 5 carbon atoms and higher result in the polyurethanes having improved hardness and modulus. Where the alkyl, alkyl radical substituent on the dihydroxy alkyl, alkyl hydantoin is hydroxyl ethyl, methyl, it gives with the reaction product of an aliphatic or alicyclic polyisocyanate and a polyester polyol or polyether polyol, preferably the polyol that is a diol or triol, a nonlight-discoloring polyurethane. For instance, where the alicyclic polyisocyanate is a fully hydrogenated methylene-di-phenyl isocyanate, hereinafter $H_{12}MDI$, the polyurethane is a nondiscoloring thermoplastic having improved melting point and thermal stability. Also, the thermoplastic polyurethanes of this invention give lower viscosity solutions with the highly polar solvents such as dimethyl formamide, dimethyl sulfone, or even dimethyl ketone.

The nature of this invention can be more readily understood by reference to the following exemplary and illustrative examples where the parts or percentages are by weight unless otherwise indicated.

EXAMPLE I

Three hundred ninety-two parts of a poly caprolactone glycol of 1200 molecular weight formed by initiating the polymerization of E-caprolactone with diethylene glycol was degassed under vacuum at 90°C. for 1 hour in a reactor. Then 94.4 parts of di-(2-hydroxylethyl) dimethyl hydantoin (sometimes called DHE), 68.2 parts neopentyl glycol, sometimes called NPG, and 5.0 parts of 2-amino-2-methyl propanol, sometimes called AMP, were added to the reactor with stirring. The reactor temperature dropped to 80°C. and 315.4 parts of isophorone diisocyanate, sometimes called IPDI, was added and stirred for 5 minutes.

The contents of the reactor were transferred to quart cans and heated for 3 hours at 138°C. and allowed to cool to room temperature before being cut in pieces one-fourth inch to one-half inch size and dissolved in sufficient solvent to give a 20 percent solution. The solvents were methyl ethyl ketone (MEK) and dimethylformamide (DMF). The solutions were cast into films on a polyethylene slab. Physical properties were determined on the solvent-free film and the results are shown in Table I.

Table I

| Properties: | |
|---|---|
| 100% Modulus, psi | 1005 |
| 300% Modulus, psi | 2895 |
| Ultimate Tensile, psi | 5605 |
| Ultimate Elongation, % | 417 |
| Viscosity 20% MEK, cps | 114 |

EXAMPLE II

The experiment of Example I was repeated except 372.3 parts of $H_{12}MDI$ was used and the physical properties of this polyurethane are shown in Table II:

Table II

| Properties: | |
|---|---|
| 100% Modulus, psi | 2165 |
| 300% Modulus, psi | 6115 |
| Ultimate Tensile, psi | 7100 |
| Ultimate Elongation, % | 328 |
| Viscosity, 20% DMF, cps | 1050 |

EXAMPLE III

The polyurethane compounds were prepared using the procedure described in Example I with the following recipes of Table III:

Table III

| | 3A | 3B |
|---|---|---|
| Polypropylene ether glycol of 1000 molecular weight | 800 | 800 |
| Diglycolamine (DGA) | 7.35 | 7.35 |
| Dipropylene glycol (DPG) | 93.9 | 93.9 |
| DHE | 86.5 | 86.5 |
| Polybutylene type antioxidant | 8 | 8 |
| Toluene diisocyanate 80/20 isomers | 334.8 | 336.5 |
| Viscosity in 20% MEK, cps | 107 | 79 |

EXAMPLE IV

These polyurethane compounds were prepared in the same manner described in Example I using polyether recipes 4A and 4B. They are similar except that an equimolar amount of DHE in B was substituted for HEHQ in 4A of Table IV:

TABLE IV

| | 4A | 4B |
|---|---|---|
| Polytetramethylene glycol of 4000 molecular weight | 400 | 400 |
| Diglycolamine (DGA) | 5.3 | 5.3 |
| Ethylene glycol (EG) | 24.2 | 24.2 |
| Neopentyl glycol (NPG) | 2.7 | 2.7 |
| HEHQ* | 85.4 | — |
| DHE | — | 93.3 |
| Isonic** | 220.5 | 220.5 |
| Properties: | | |
| 100% Modulus, psi | 264 | 400 |
| 300% Modulus, psi | 513 | 1355 |
| Ultimate Tensile, psi | 4373 | 6380 |
| Ultimate Elongation, % | 470 | 483 |
| Viscosity, 20% DMF, cps | 2095 | 812 |

*HEHQ is hydroxyethyl hydroquinone which is described in U.S. Patent No. 3,016,364 as a curative.
**Isonic is a code designation for a commercial toluene diisocyanate 80/20.

EXAMPLE V

The ingredients of Recipe 5A and 5B were mixed and reacted according to the prepolymer method to form a cured polyurethane on standing overnight. The cured polyurethane had physical properties shown in Table 5 below:

TABLE V

| | 5A | 5B |
|---|---|---|
| Polytetramethylene glycol of 1000 molecular weight | 400 | 400 |

TABLE V-continued

|  | 5A | 5B |
|---|---|---|
| Dipropylene glycol (DPG) | 10.7 | 10.7 |
| DHE | 65 | 65 |
| Ethylene glycol | 31 | 31 |
| Diglycolamine (DGA) | 5.25 | 5.25 |
| MDI | 323.5 | — |
| $H_{12}$MDI | — | 339.2 |
| Reaction Ratio OH/NCO | 0.975 | 0.975 |
| Properties: | | |
| Viscosity in 20% DMF solution, cps | 2020 | 3170 |
| Viscosity in 20% THF solution, cps | 16,480 | 1870 |
| Shore A hardness | 95 | 96 |
| Tensile, psi | 7965 | 7018 |
| % Elongation, psi | 363 | 358 |
| 100% Modulus, psi | 785 | 1468 |
| 300% Modulus, psi | 5280 | 5065 |

The high hardness of these polyurethanes was unusual in that they were still soluble in DMF and THF. The solvent solutions of these polyurethanes are particularly desirable for spray coating objects and yield coated objects having a very tough polyurethane coating. Also, these polyurethanes in pelletized form can be fed to an extruder and used to extrude various shaped objects such as hose, grommets, sheet, boards and other complicated shaped articles.

Any of the polyester polyols or polyether polyols can be used in the above recipes. Likewise, any of the organic polyisocyanates can be used in the above recipes in conjunction with dihydroxyalkyl alkyl hydantoin alone, or a supplemental curative of the monomeric polyols of less than 700 molecular weight, or organic diamines.

The reactive hydrogen material of 700 and higher molecular weight and preferably 1000 to 3000 molecular weight useful in this invention are well known and well described in U.S. Pat. No. 3,072,582 to Frost. Also, this patent discloses a list of representative examples of the organic polyisocyanates useful in this invention. Likewise, U.S. Pat. No. 3,036,996 to Kogan discloses the organic diamines useful as supplemental curatives and Frost discloses the monomeric polyols as precursors for preparation of the polyether polyols.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane prepared by reacting a mole of a reactive hydrogen material of 700 and higher molecular weight selected from the class consisting of polyester polyols and polyether polyols, with 1.2 to 3.5 moles of organic polyisocyanate and 0.2 to 2 moles of hydantoin containing dihydroxy alkyl and dialkyl substituents where the alkyl radical contains from 1 to 10 carbon atoms.

2. The polyurethane of claim 1 wherein the dihydroxy alkyl substituent is 2-hydroxyethyl and the dialkyl substituent is dimethyl.

3. The polyurethane of claim 1 wherein the polyisocyanate is selected from the class consisting of hydrogenated methylene di(phenyl isocyanate) and isophorone diisocyanate.

* * * * *